United States Patent
Saito et al.

(10) Patent No.: US 6,710,998 B1
(45) Date of Patent: Mar. 23, 2004

(54) MULTI-LAYER CAPACITOR AND METHOD FOR MANUFACTURING SAME

(75) Inventors: Kenji Saito, Tokyo (JP); Hirokazu Chazono, Tokyo (JP)

(73) Assignee: Taiyo Yuden Co., Ltd., Tokyo (JP)

(*) Notice: Subject to any disclaimer, the term of this patent is extended or adjusted under 35 U.S.C. 154(b) by 0 days.

(21) Appl. No.: 10/610,548

(22) Filed: Jul. 2, 2003

(30) Foreign Application Priority Data

Jul. 3, 2002 (JP) .................................... 2002-194374

(51) Int. Cl.[7] .................................................. H01G 4/20
(52) U.S. Cl. ..................... 361/313; 361/305; 361/311; 361/306.1; 361/321.1; 257/303; 257/296
(58) Field of Search ................................. 361/311, 305, 361/313, 321.1, 306.1, 310, 321.4, 301.4, 312, 320, 321, 328; 257/303, 308

(56) References Cited

U.S. PATENT DOCUMENTS

| | | | | |
|---|---|---|---|---|
| 4,949,217 A | * | 8/1990 | Ngo | 361/328 |
| 5,072,329 A | * | 12/1991 | Galvagni | 361/321.2 |
| 5,742,472 A | * | 4/1998 | Lee et al. | 361/321.4 |
| 6,011,683 A | * | 1/2000 | Dat | 361/306.1 |
| 6,128,177 A | * | 10/2000 | Titulaer et al. | 361/305 |
| 6,297,524 B1 | * | 10/2001 | Vathulya et al. | 257/303 |

* cited by examiner

*Primary Examiner*—Dean A. Reichard
*Assistant Examiner*—Nguyen T. Ha
(74) *Attorney, Agent, or Firm*—Bacon & Thomas, PLLC

(57) ABSTRACT

A multi-layer capacitor includes a plurality of dielectric layers, a pair of external electrodes and a multiplicity of internal electrode layers, each internal electrode layer being interposed between every two neighboring dielectric layers. Said two neighboring internal electrode layers and the dielectric layer disposed therebetween form a unit capacitor so that the multiplicity of internal electrode layers and the dielectric layers therebetween constitute a stack of three or more vertically stacked unit capacitors. The electrostatic capacitance of the unit capacitor located at a center of the stack is greater than those of the unit capacitors located at an is upper end and a lower end of the stack.

20 Claims, 6 Drawing Sheets

MULTI-LAYER CAPACITOR AND METHOD FOR MANUFACTURING SAME

FIELD OF THE INVENTION

The present invention relates to a multi-layer capacitor and method for manufacturing same; and more particularly, to a multi-layer capacitor including a plurality of laminated internal electrode layers having dielectric layers interposed therebetween forming a chip structure.

BACKGROUND OF THE INVENTION

A multi-layer capacitor normally includes a plurality of laminated internal electrode layers having dielectric layers interposed therebetween, forming a chip structure. Edges of the internal electrode layers are alternately exposed to two opposing end surfaces of the chip. The edges of the internal electrode layers exposed to one of the two opposing surfaces of the chip are electrically connected to one of a pair of external electrodes; and, similarly, those of the internal electrode layers exposed to the other opposing surface of the chip are electrically connected to the other external electrode.

Such multi-layer capacitor includes a number of unit capacitors, which are connected in parallel to the pair of external electrodes. Each of the unit capacitors is formed by two adjacent internal electrode layers and a dielectric layer interposed therebetween. In principle, the electrostatic capacitance of such a multi-layer capacitor, i.e., a stack of vertically stacked unit capacitors, measured through the external electrodes is to be equal to the sum of the electrostatic capacitances of the individual unit capacitors. Thus, the capacitors are designed on such basis.

However, the overall electrostatic capacitance of the multi-layer capacitor actually measured through the external electrodes is lower than the sum of the electrostatic capacitances of the individual unit capacitors measured with the external electrodes removed. Moreover, the lowering of electrostatic capacitance varies from about 20 to 30% even within a same type of multi-layer capacitors. In particular, such lowering of electrostatic capacitance becomes ever severer in case of large capacitance type having a large number of thin dielectric layers.

The inventors of the present invention have studied the capacitance lowering problem of the prior art and conducted a series of experiments to rectify the problem; and have discovered that the residual stresses concentrated in a central region of the chip capacitor are largely responsible for the lowering the capacitance, although various other factors may also be attributable to such lowering of electrostatic capacitance. The manufacturing process of the chip type multi-layer capacitor includes the steps of forming an unsintered laminated structure by alternately stacking and compressing unsintered internal electrode layers and unsintered dielectric layers; and sintering the unsintered laminated structure so obtained. During the step of forming the laminated structure and the sintering step, varying stresses are generated at different locations within the body being processed, resulting in the residual stresses having different magnitudes and directions within the sintered chip. The residual stresses tend to be greater in the central region than the outer peripheral regions of the chip in the laminated direction; and parts of the dielectric layers having greater high residual stresses, when biased, are more vulnerable to the piezoelectric effect, leading to the lowering of the overall electrostatic capacitance.

SUMMARY OF THE INVENTION

It is, therefore, an object of the present invention to provide a multi-layer capacitor capable of securing a stable electrostatic capacitance close to a designed value and increasing a breakdown or withstanding voltage thereof.

In accordance with one aspect of the invention, there is provided a multi-layer capacitor including: a plurality of dielectric layers; a pair of external electrodes; and a multiplicity of internal electrode layers, each of the internal electrode layers being interposed between each pair of neighboring dielectric layers; one of said each pair of neighboring internal electrode layers being electrically connected to one of a pair of the external electrodes and the other one of said each pair of neighboring internal electrode layers being electrically connected to the other external electrode; and said each pair of neighboring internal electrode layers and the dielectric layer disposed therebetween forming a unit capacitor so that said multiplicity of internal electrode layers and dielectric layers therebetween constitute a stack of three or more vertically stacked unit capacitors, wherein the electrostatic capacitance of the unit capacitor located at a center of the stack is greater than those of the unit capacitors located at an upper end and a lower end of the stack.

In accordance with another aspect of the invention, there is provided a manufacturing method of the multi-layer capacitor including the steps of preparing green sheets; forming internal electrode layers on the green sheets; laminating and pressing the green sheets with the internal electrode layers formed thereon to thereby provide an unsintered stack of vertically stacked unit capacitors, the stack having two opposite end surfaces; sintering the unsintered stack; and forming external electrodes on the two opposite end surfaces, wherein the pressure employed in pressing one of the green sheets forming the unit capacitor located at a center region of the stack is higher than those employed in pressing the green sheets forming the unit capacitors located at a top end and a bottom end of the stack.

In accordance with still another aspect of the invention, there is provided a manufacturing method of the multi-layer capacitor including the steps of: preparing green sheets; forming internal electrode layers on the green sheets; laminating and compressing the green sheets with the internal electrode layers formed thereon to thereby provide an unsintered stack of vertically stacked unit capacitors, the stack having two opposite end surfaces; sintering the unsintered stack; and forming external electrodes on the two opposite end surfaces, wherein the dielectric constant of one of the green sheets forming the unit capacitor located at a center region of the stack is higher than those of the green sheets forming the unit capacitors located at a top end and a bottom end of the stack.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
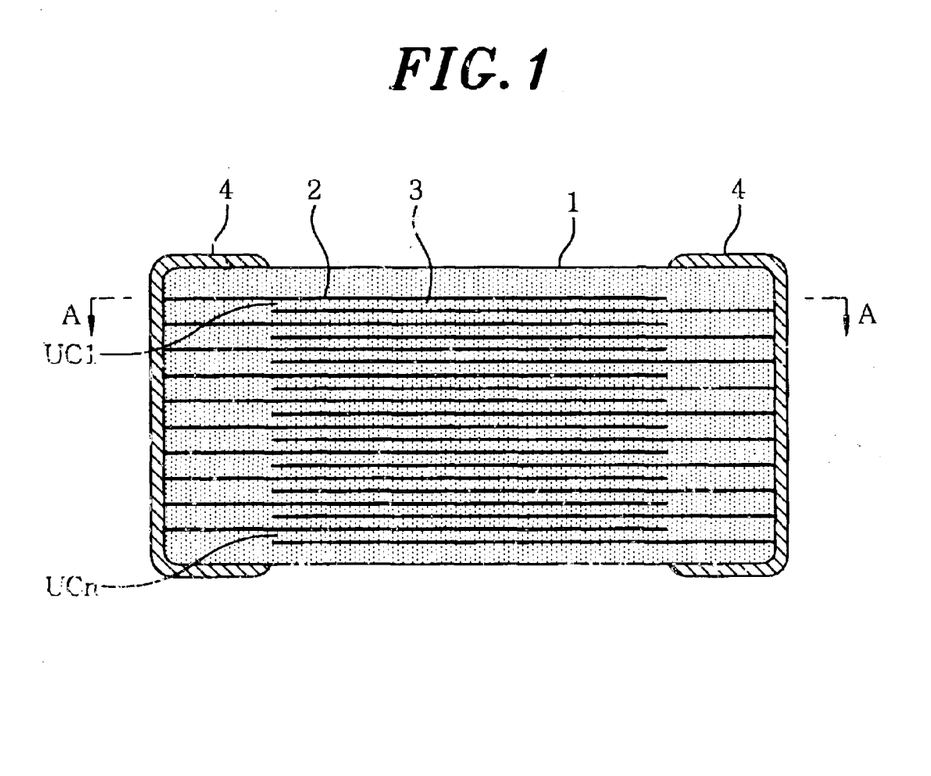
FIG. 1 represents a longitudinal cross sectional view of a multi-layer capacitor in accordance with a first preferred embodiment of the present invention.
Figure 2:
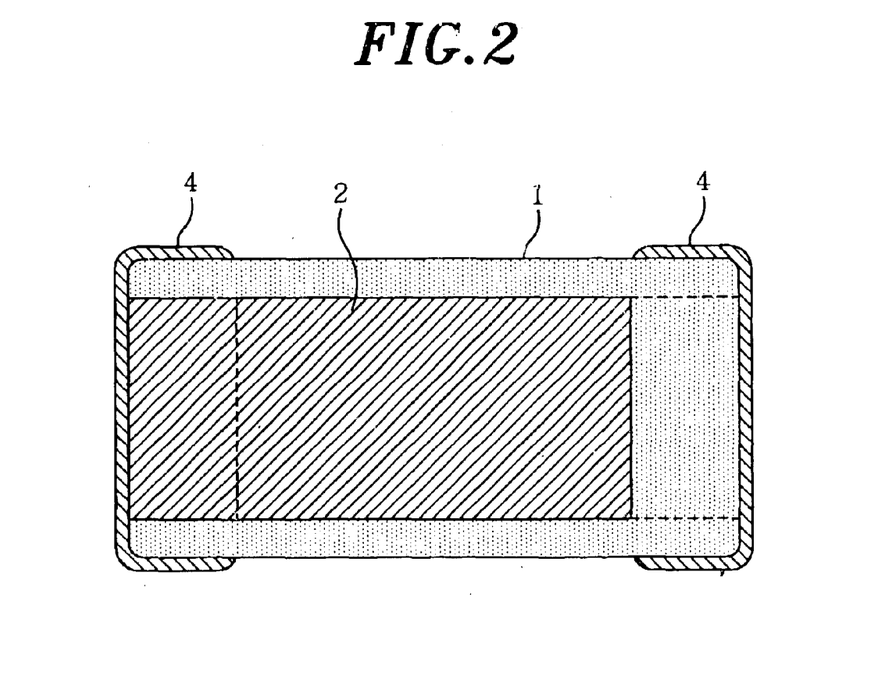
FIG. 2 sets forth a cross sectional view of the multi-layer capacitor cut along the line A—A shown in FIG. 1.

FIG. 1 is a longitudinal cross sectional view of a multi-layer capacitor in accordance with a first preferred embodiment of the present invention. FIG. 2 sets forth a cross sectional view of the multi-layer capacitor cut along the line A—A of FIG. 1. Reference numeral 1 represents a chip; 2, internal electrode layers; 3, dielectric layers; and 4, external electrodes.

The chip 1 generally having a cuboidal shape includes a dielectric ceramic, a major component thereof being a perovskite structured dielectric material, for example, $BaTiO_3$. The chip 1 has a multi-layer structure of alternately stacked internal electrode layers 2 (twenty layers are shown FIG. 1) and the dielectric layers 3.

The internal electrode layers 2 in the shape of a thin rectangular plate are made of, for example, Ni, Cu, Pd, Pt, Ag, Au, or an alloy thereof. Edges of each internal electrode layers 2 are alternately exposed to two opposite end surfaces (the end surfaces in the length direction) of the chip 1.

The external electrodes 4 made of, for example, Ni, Cu, Pd, Pt, Ag, Au, or an alloy and/or combination thereof, are formed on both lateral end portions of the chip 1 so as to cover the two opposite end surfaces and parts of the four remaining side surfaces of the chip 1.

The edges of the internal electrode layers 2 exposed to one of the two end surfaces of the chip 1 are electrically connected to one of the two external electrodes 4, and those exposed to the other end surface of the chip 1 are electrically connected to the other external electrode 4.

Figure 3A:
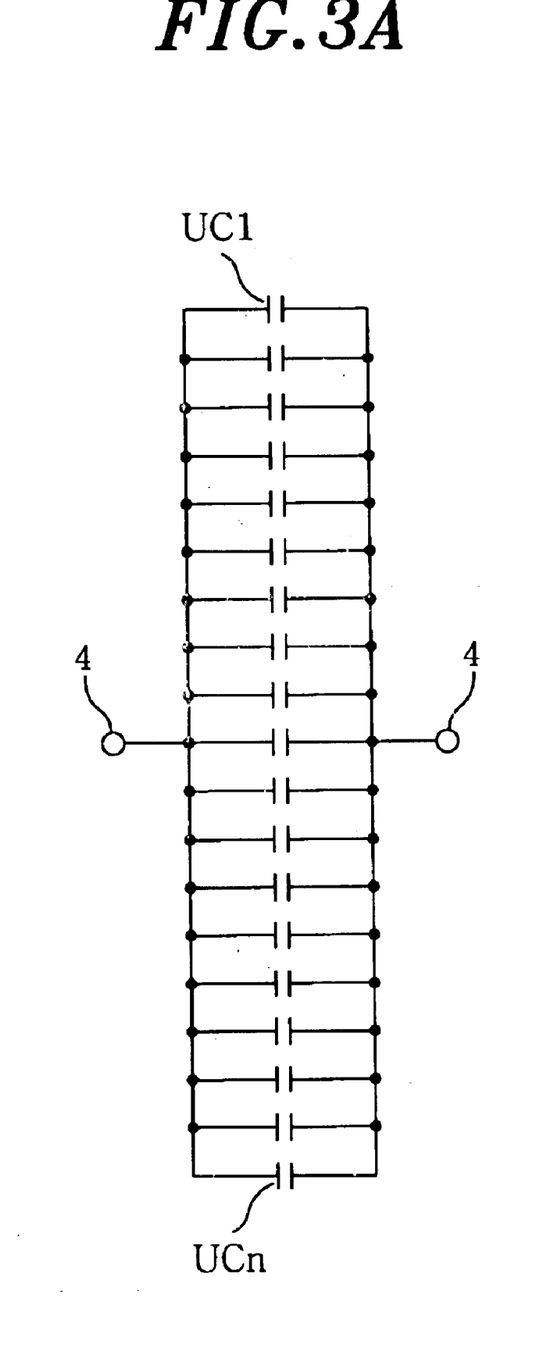
FIGS. 3A and 3B depict an equivalent circuit of the multi-layer capacitor shown in FIG. 1 aid a graph illustrating the varying electrostatic capacitances of unit capacitors, respectively.

The exemplary multi-layer capacitor includes a total of nineteen unit capacitors (UC1 to UCn, n being 19), each being formed by a pair of adjacent internal electrode layers 2 and a dielectric layer 3 interposed therebetween along the stacked or laminated direction. Therefore, the chip 1 includes therein vertically stacked unit capacitors. As shown in FIG. 3A, the nineteen unit capacitors (UC1 to UCn) are connected in parallel to the pair of external electrodes 4.

Figure 3B:
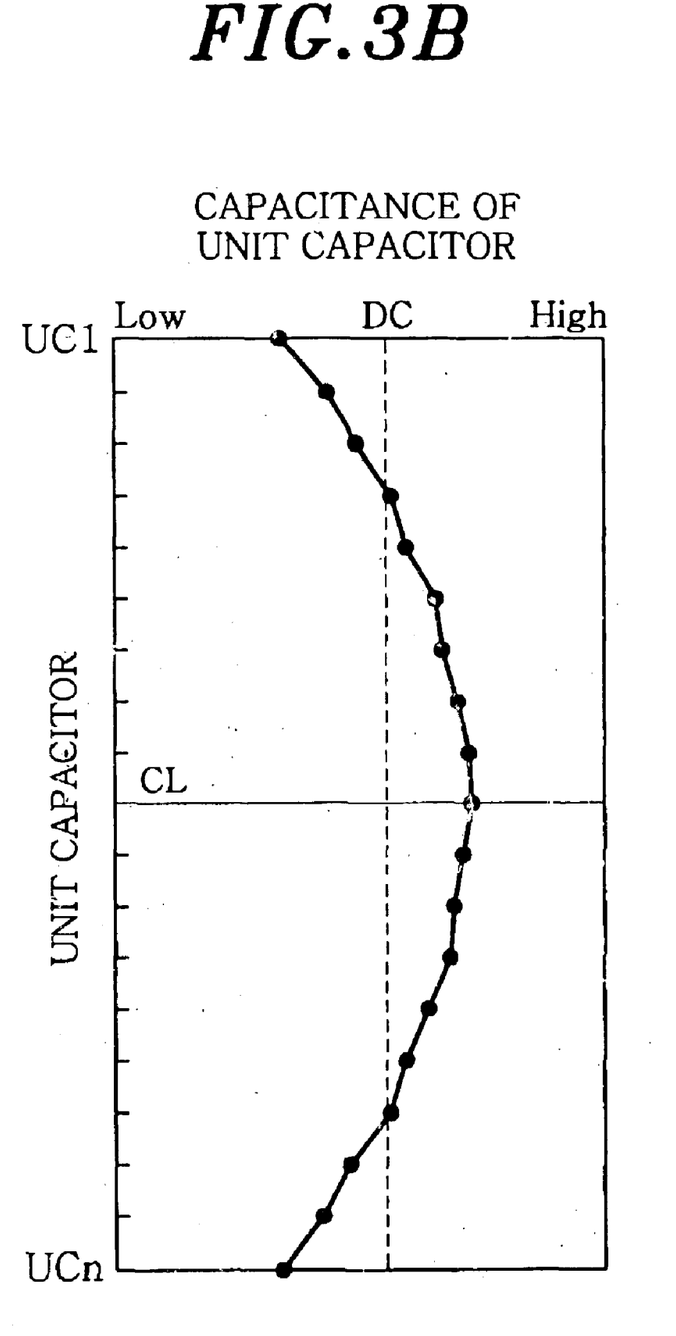

FIG. 3B shows an electrostatic capacitance of each individual unit capacitor (UC1 to UCn) measured without the presence of external electrodes 4. In accordance with the present invention, the electrostatic capacitance is higher at a center region than at both ends of the chip 1 along the laminated direction.

More specifically, the electrostatic capacitances of the unit capacitors (UC1 to UCn) increase monotonously or gradually from the both ends (UC1 to UCn) to the center region (CL) in the laminated direction. Also, the electrostatic capacitances of the unit capacitors (UC), placed at both ends and in the vicinity thereof along the laminated direction, are lower than the designed electrostatic capacitance (DC) of the unit capacitor, shown in dotted line in FIG. 3B, while those at the center region and in the vicinity thereof along the laminated direction are higher than the designed electrostatic capacitance (DC).

Herein, the unit capacitor at the center region in the laminated direction represents the unit capacitor formed by the (m/2) th and the ((m/2)+1) th internal electrode layers and the dielectric layer residing therebetween when m being an even integer greater than 2; and unit capacitors at both ends in the laminated direction represent two outermost unit capacitors of the chip 1. In case the number of the internal electrode layers is an odd number greater than 3, there will be two enter unit capacitors.

A method for manufacturing the above-described multi-layer capacitor will now be described in detail.

First, reduction resistive dielectric powder is prepared, which includes at least perovskite structured dielectric material, reduction resistive material, and an oxide of rare earth element, for example, $Ho_2O_3$ or $CeO_2$ or the like, and the reduction resistive material being formed of, e.g., $MnO_2$, $MgO$, and/or other kind of oxide of a bivalent or trivalent metal. The above perovskite structured dielectric material is made of $BaTiO_3$ or $BaTiO_3$-based material wherein Ba and/or Ti of $BaTiO_3$ are replaced with their substitutes. For instance, the Ba site of $BaTiO_3$ may partially be substituted with, e.g., Ca, Sr, Mg, Pb or a combination thereof; and the Ti site of $BaTiO_3$ may partially be substituted with, e.g., Zn, Sn or a combination thereof. Thereafter, a slurry is formed by, e.g., ball-milling the mixture of the dielectric powder, organic binder, organic solvent, dispersion agent and plasticizer prepared by being mixed according to an appropriate ratio by weight.

Next, thus obtained slurry is coated on a base film made of PET or the like with a thickness ranging from about 1 to 5 μm by employing a coating method using a doctor blade, or the like, are then the coated slurry is dried to obtain green sheets.

Next, a conductive paste, which is formed by mixing powder of a base metal, e.g., Ni and/or Cu, organic binder and organic solvent according to an appropriate ratio by weight, is printed on the green sheets to predetermined patterns with a thickness ranging from about 0.5 to 3 μm by a thick film forming process, e.g., screen printing or gravure printing method. The printed conductive paste is then dried so that an m×n array of unsintered internal electrode layers is formed.

Next, one or more green sheets not having thereon the unsintered internal electrode layers (referred to bare green sheets hereinafter) are stacked and then a required number of green sheets having thereon the unsintered internal electrode layers are stacked on the stacked bare green sheet. Finally, one or more additional green sheets are stacked on said prepared stack of green sheets and then the entire structure is subject to a press operation so as to increase the compatibility thereof to provide an unsintered laminated body.

Specifically, a green sheet placed on a base film is pressed against an adjacent green sheet below, and thereafter, the base film is exfoliated therefrom. Such procedure is sequentially repeated until the entire structure is obtained, which is then followed by the press operation.

Thereafter, the unsintered laminated body is diced into chips each having a desired size by using a dicing apparatus, etc. The diced unsintered chips are loaded into a furnace. Subsequently, removal of the binder is performed on the unsintered chips at a predetermined temperature for a preset time period under an atmosphere with a low partial pressure of oxygen or a reductive atmosphere of, for example, $N_2$ or $N_2+H_2$; and the binder removed chips are then subject to a main heat treatment process at a given temperature for a predetermined period of time. Throughout these processes, the unsintered internal electrode layers containing therein the powder of base metal are sintered without being oxidized, and the green sheets containing the reduction resistive dielectric powder are also sintered.

During the sintering process, the sintering condition is controlled to induce the reduction in the dielectric constants of the dielectric layers at the both ends of the chip along the laminated direction; in such a manner that the degree of reduction in the dielectric constant is minimized toward the center in the laminated direction. As a result, the dielectric constants of the dielectric layers of the unit capacitor gradually increase from the both ends to the center of the chip along the laminated direction.

In other words, the electrostatic capacitance of the unit capacitor varies with the dielectric constant of the dielectric layer thereof in the first preferred embodiment of the invention. Multi-layer capacitors having such tailed configuration of the dielectric constants of the dielectric layers can be obtained by way of heat treating the chips, for example, first in a strong reduction resistive atmosphere and then in a weak reduction resistive atmosphere.

Subsequently, the formation of external electrodes is carried out as follows: first the sintered chips are barrel-polished, and then the above described conductive paste is applied to the two lateral end portions of each sintered chip, for example, by dipping or roll coating method. Next, in a similar atmosphere as in the sintering process, i.e., the atmosphere with a low oxygen partial pressure of the reductive atmosphere, the sintered chips with the conductive paste applied thereon are heat-treated for a given period of time at a given temperature.

The heat treatment of the external electrodes can be executed concurrently with the sintering of the unsintered chips. In this case, the conductive paste is applied first on the two end portions of each unsintered chip; and then the unsintered chips with the conductive paste applied thereon are loaded in a sintering furnace to simultaneously carry out the sintering of the unsintered chips and the conductive paste for the external electrodes.

In the embodiment described above, the heat treatment conditions of the binder removal process and the main heat treatment process of the unsintered are controlled to have the dielectric constant of the dielectric layer in each unit capacitor to increase gradually from the ends to the center in the laminated direction. However, such tailed configuration of dielectric constants can also be achieved without calling for the manipulation of heat treatment of heat treatment conditions.

For instance, such inventive configuration of dielectric constant can be equally obtained by way of preparing several types of green sheets having approximately the same thickness but with various dielectric constants by varying, e.g., the contents and/or the composition of the green sheets; and then stacking the green sheets in such a manner that those having a high dielectric constant are situated in the center in the laminated direction and the dielectric constant of the green sheets are gradually reduced toward the ends in the laminated direction.

The first preferred embodiment has been described in connection with the conductive paste containing therein the base metal powder. However, the multi-layer capacitors of the present invention can also be manufactured in an alternative manner, for example, by way of using a conductive paste for the internal electrode layers and external electrode layers including powder of an oxidation resistive metal rather than the base metal, and a slurry not containing therein the reduction resistive material; and performing the sintering process in an atmosphere with a high partial pressure of oxygen or an oxidative atmosphere, for example, air.

In the multi-layer capacitor described above, the dielectric constants of the dielectric layers of the unit capacitors are tailed to increase from the ends to the center along the laminated direction by way of manipulating the heat treatment conditions of the binder removal and sintering process of the unsintered laminated structures or employing the green sheets having different dielectric constants. However, the above features of the electrostatic capacitance can be equally obtained by employing a configuration as shown in FIG. 4.

Figure 4:
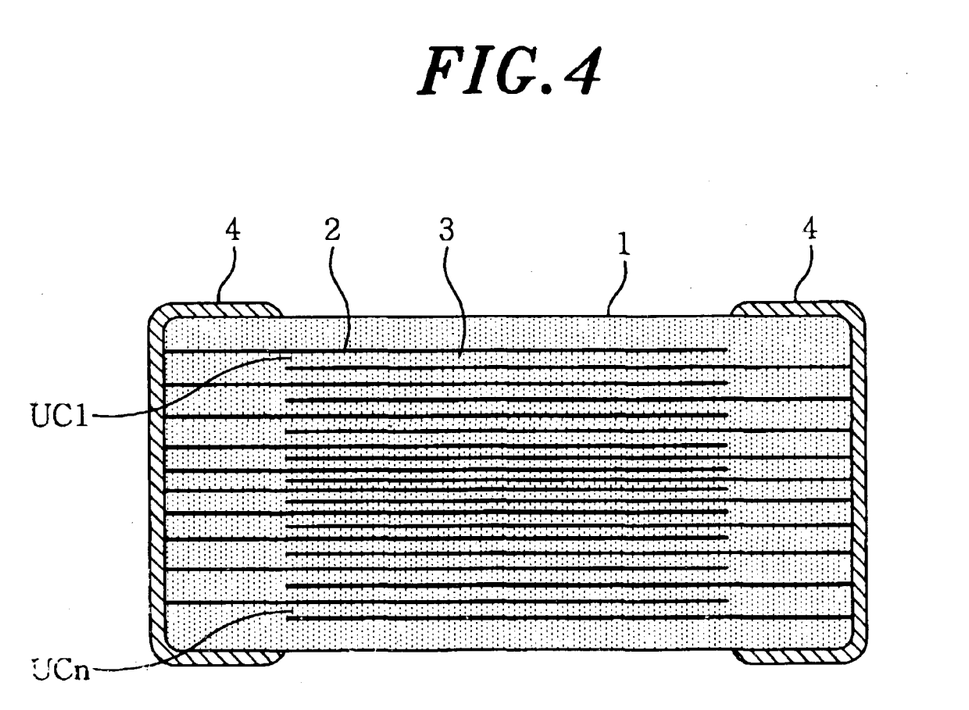
FIG. 4 presents a longitudinal cross sectional view of a multi-layer capacitor in accordance with a second preferred embodiment of the present invention.

A multi-layer capacitor in accordance with a second preferred embodiment of the invention as shown in FIG. 4 differs from that shown in FIGS. 1 and 2, in that the thickness of the dielectric layers becomes gradually thinner from the ends to the center in the laminated direction, while the dielectric constants of the dielectric layers of the unit capacitors remain substantially constant. The rest of the configuration is the same as that of FIG. 1.

A detailed description of an exemplary manufacturing method of the multi-layer capacitor will now be described hereinafter.

First, the same type of slurry as described above in the manufacturing method of the multi-layer capacitor shown FIG. 1 is prepared. Next, the slurry so obtained is coated on a base film made of PET or the like with a thickness ranging from about 1 to 5 $\mu$m by employing a coating method using a doctor blade, a die coater or the like, and then the coated slurry is dried to obtain green sheets.

Next, the same type of conductive paste as described above in the manufacturing method of the multi-layer capacitor shown FIG. 1 is printed on the green sheets to predetermined patterns with a thickness ranging from about 0.5 to 3 $\mu$m by a thick film forming process, e.g., screen printing or gravure printing method. The printed conductive paste is then dried so that an m×n array of unsintered internal electrode layers is formed.

Next, one or more green sheets not having thereon the unsintered internal electrode layers (referred to bare green sheets hereinafter) are stacked and then a required number of green sheets having thereon the unsintered internal electrode layers are stacked on the stacked bare green sheet. Finally, one or more additional green sheets are stacked on the thus prepared stack of green sheets and then the entire structure is subject to a press operation so as to increase the compatibility thereof to provide an unsintered laminated body. Specifically, a green sheet placed on a base film is pressed against an adjacent green sheet below, and thereafter the base film is exfoliated therefrom. Such procedure is sequentially repeated until the entire structure is obtained, which is then followed by the press operation.

In this case, a pressure pressing the green sheet at the center in the laminated direction is the highest, and the pressure is controlled to be gradually reduced toward the ends in the laminated direction. As a result, the thicknesses of the green sheets of the unsintered laminated body gradually become thinner from the ends to the center in the laminated direction. In other words, the electrostatic capacitance of the unit capacitor in accordance with the second preferred embodiment varies with the thickness of the dielectric layers of the unit capacitor.

Alternatively, temperatures of an upper and a lower puncher of a press used in the pressing process can be made to be controlled to adjust the thicknesses of the dielectric layers independently. Thus, at the time of pressing the green sheet at the center in the laminated direction, the temperature of the upper punch contacting the center green sheet is set to be higher than that of the lower punch contacting the bottom-most green sheet in the laminated direction. Similarly the thicknesses of the green sheets of the unsintered laminated structure can be made to gradually become thinner from the ends to the center in the laminated direction by varying the punch temperature, e.g., in such a manner that the temperature of the upper punch is set to be higher when a dielectric layer contacting the upper punch needs to be thinner.

Thereafter, the unsintered laminated body is diced into chips each having a desired size by using a dicing apparatus, etc. The diced unsintered chips are loaded into a furnace. Subsequently, removal of the binder is performed on the unsintered chips at a predetermined temperature for a preset time period under an atmosphere with a low partial pressure of oxygen or a reductive atmosphere of, for example, $N_2$ or $N_2+H_2$; and the binder removed chips are then subject to a main heat treatment process at a given temperature for a predetermined period of time. Throughout these processes, the unsintered internal electrode layers containing therein the powder of base metal are sintered without being oxidized, and the green sheets containing the reduction resistive dielectric powder are also sintered.

Subsequently, the formation of external electrodes is carried out as follows: first the sintered chips are barrel-polished, and then the above described conductive paste is applied to the two lateral end portions of each sintered chip, for example, by the dipping or roll coating method. Next, in a similar atmosphere as in the sintering process, i.e., the atmosphere with a low oxygen partial pressure of the reductive atmosphere, the sintered chips with the conductive paste applied thereon are heat-treated for a given period of time at a given temperature.

The heat treatment of the external electrodes can be executed concurrently with the sintering of the unsintered chips. In this case, the conductive paste is applied first on the two end portions of each unsintered chip; and then the unsintered chips with the conductive paste applied thereon are loaded in a sintering furnace to simultaneously carry out the sintering of the unsintered chips and the conductive paste for the external electrodes.

As described above, by way of adaptively adjusting pressure conditions in compressing the green sheets, the electrostatic capacitances of the unit capacitors can be controlled to gradually increase from the ends to the center in the laminated direction. However, with various green sheets having different thicknesses, and by placing the green sheet having a smallest thickness at the center in the laminated direction and placing those of gradually increasing thicknesses toward the ends in the laminated direction, the electrostatic capacitances of the individual unit capacitors can also be made to be gradually increased from the ends toward the center in the laminated direction, without having to tailor the above-mentioned pressure conditions.

Similarly, a variety of green sheets with different thicknesses that vary in inverse proportion to the dielectric constants thereof can be used as well. That is to say, by placing a green sheet having a smallest thickness but with a largest dielectric constant at the center in the laminated direction, and placing those of gradually increasing thicknesses and decreasing dielectric constants toward the ends in the laminated direction, the electrostatic capacitances of the unit capacitors can also be made to be gradually raised from the ends toward the center in the laminated direction, without having to tailor the above-mentioned pressure conditions.

The second preferred embodiment has been described in connection with the conductive paste containing therein the base metal powder. However, the multi-layer capacitors of the present invention can also be manufactured in an alternative manner, for example, by way of using a conductive paste for the internal electrode layers and external electrode layers including powder of an oxidation resistive metal rather than the base metal, and a slurry not containing therein the reduction resistive material; and performing the sintering process in an atmosphere with a high partial pressure of oxygen or an oxidative atmosphere, for example, air.

In accordance with the present invention, each of the multi-layer capacitors described with reference to FIGS. 1 and 4 is configured such that the electrostatic capacitances of the individual unit capacitors (UC1 to UCn) in the chip 1 gradually increase from the both ends to the center in the laminated direction. By doing so, the net electrostatic capacitance of the multi-layer capacitor measured through the external electrodes 4 can be made to be close to the sum of the electrostatic capacitances of the unit capacitors individually measured without the presence of the external electrodes 4.

One hundred measurements were taken for multi-layer capacitors each having a multiplicity of unit capacitors, electrostatic capacitance of which gradually increase from both ends to the center in the laminated direction in accordance with the present invention. Each of the multilayer capacitor includes 200 layers and is a B characteristic multi-layer capacitor of 3216 type (the length is 3.2 mm and the width and height are 1.6 mm, respectively) with nominal electrostatic capacitance of 2000 nF.

The sum of the electrostatic capacitances of the individual unit capacitors for one capacitor was on average 2230 nF, and the net electrostatic capacitance of the multi-layer capacitor measured through the external electrodes 4 was on average 1895 nF, indicating about 15.1% decrease of capacitance. Similarly, hundred measurements were carried out with conventional multi-layer capacitors each having unit capacitors of substantially identical electrostatic capacitances. The sum of the electrostatic capacitances of the unit capacitors for one capacitor was on average 2141 nF, and the net electrostatic capacitance of the multi-layer capacitor measured through the external electrodes 4 was 1580 nF, yielding a decrease of about 26.3%.

The electrostatic capacitances of individual unit capacitors were measured as follows: First, the external electrodes of a multi-layer capacitor were removed by grinding or etching to expose the internal electrodes; and then through needle-shaped measurement terminals in contact with the exposed internal electrodes, the electrostatic capacitance of each unit capacitor were measured by using 4284 type LCR-meter of Agilent Technologies.

As described above, the multi-layer capacitor in accordance with the present invention can secure a stable electrostatic capacitance close to the designed value by reducing the lowering of the capacitance as a whole, even with the presence of residual stresses, considered as one of the primary attributing factors in lowering the capacitance, wherein the greater residual stresses are preset at the center than at the ends in the laminated direction and the parts under larger residual stresses are more readily affected by the piezoelectric effect.

FIG. 3B shows the electrostatic capacitances of the unit capacitors (UC1 to UCn) gradually increasing from both the ends to the center in the laminated direction. However, it is to be noted that the above operation and effect can be achieved as long as the electrostatic capacitance of the center is bigger than those of the both ends in the laminated direction, without having to gradually increase the electrostatic capacitances of the unit capacitors (UC1 to UCn) from both the ends toward the center in the laminated direction.

Figure 5A:
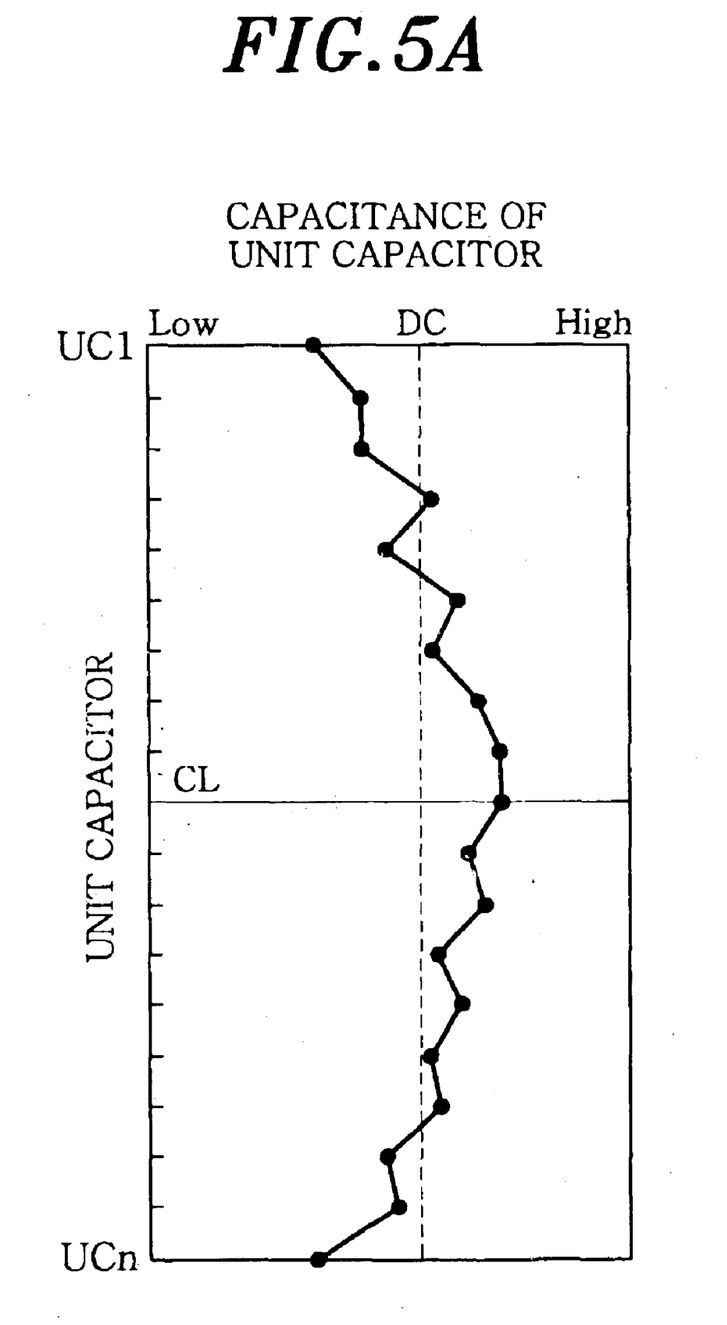
FIGS. 5A and 5B provide exemplary graphs showing electrostatic capacitances of unit capacitors varying in different manners from that of FIG. 3B.
Figure 5B:
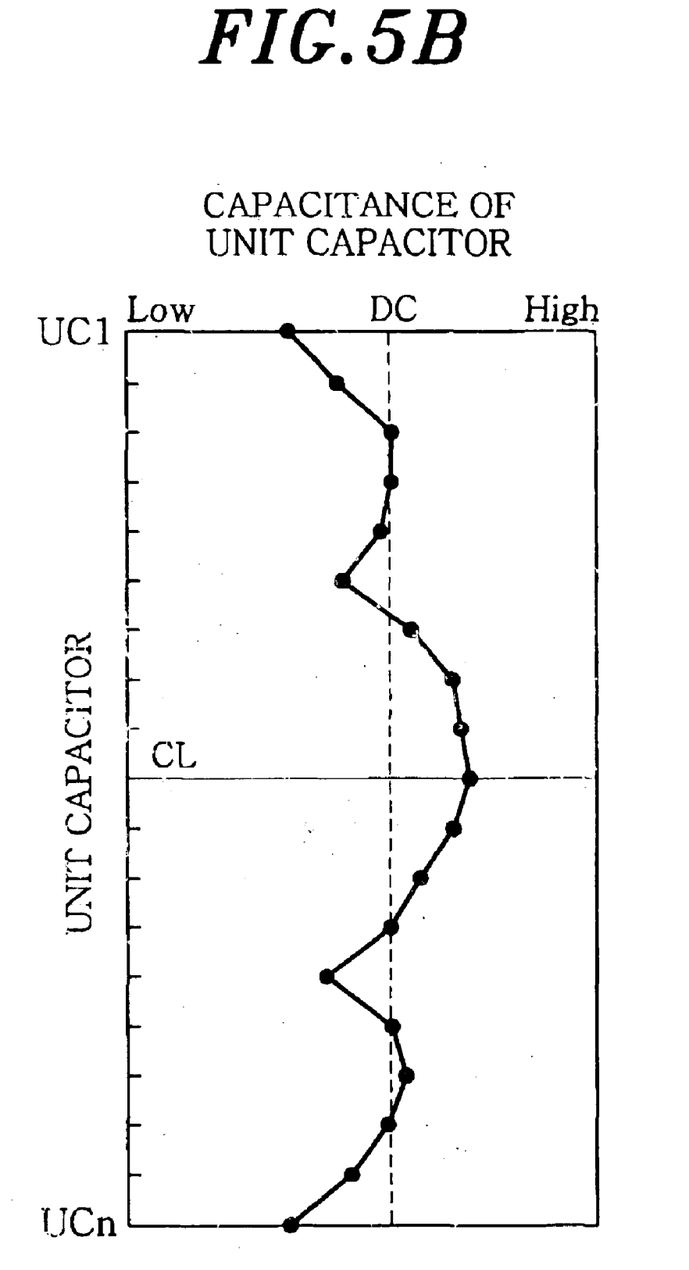

FIGS. 5A and 5B show such examples, wherein the electrostatic capacitances of unit capacitors (UC1 to UCn) involve increase and decrease, that is non-monotonously, when varying from the both ends to the center in the laminated direction.

FIG. 5A shows an exemplary capacitance profile of the individual unit capacitors in which the capacitance of the center unit capacitor is greater than those of the two end unit capacitors; but, in the course of the capacitance variation from the latter to the former, some unit capacitors exhibit the lowering in capacitance. The multi-layer capacitor, notwithstanding such profile, can secure a stable net electrostatic capacitance close to the designed value by reducing the lowering of the capacitance as a whole.

FIG. 5B is a measurement result of a multi-layer capacitor manufactured by employing a block stacking method, wherein a number of unsintered laminated unit bodies (blocks) are prepared first, each unit body being made by repeatedly placing a green sheet supported on a base film on an adjacent green sheet below and peeling off the base film therefrom until a predetermined green sheets are stacked; and then thus prepared unsintered laminated unit bodies are stacked and pressed. Owing to the nature of the block stacking method, the profile of electrostatic capacitances of the unit capacitors shows a mountain like curve for each unit block. Even with such capacitance profile, the multi-layer capacitor can secure a stable net electrostatic capacitance close to a designed value by limiting the lowering of the capacitance as a whole.

Additionally, in a case of a multi-layer capacitor shown in FIG. 4, the block stacking method can be performed as follows: Unsintered laminated unit bodies (blocks) having different thicknesses by varying pressure in compressing the green sheets are prepared first; and then the unsintered laminated unit bodies are overlapped in such a manner that an unsintered laminated unit body having green sheets with small thickness is placed between two unsintered laminated unit bodies having green sheets of large thickness.

The above-described multi-layer capacitors have been exemplarily described as having a total of twenty internal electrodes 2. However, the number of the internal electrodes 2 employed may be varied to be greater or less than 20 when necessary, and it should be apparent to those skilled in the art that the above-described advantageous operation effect can be obtained regardless of the number of internal electrode layers.

While the invention has been shown and described with respect to the preferred embodiments, it should be understood that various changes and modifications may be made without departing from the spirit and scope of the invention as defined in the following claims.

What is claimed is:

1. A multi-layer capacitor comprising:
a plurality of dielectric layers;
a pair of external electrodes; and
a multiplicity of internal electrode layers, each of the internal electrode layers being interposed between each pair of neighboring dielectric layers; one of said each pair of neighboring internal electrode layers being electrically connected to one of the external electrodes and the other one of said each pair of neighboring internal electrode layers being electrically connected to the other external electrode; and said each pair of neighboring internal electrode layers and the dielectric layer disposed therebetween forming a unit capacitor so that said multiplicity of internal electrode layers and dielectric layers therebetween constitute a stack of three or more of vertically stacked unit capacitors,
wherein the electrostatic capacitance of the unit capacitor located at a center of the stack is greater than those of the unit capacitors located at an upper end and a lower end of the stack.

2. The multi-layer capacitor of claim 1, wherein the electrostatic capacitances of the unit capacitors monotonously increase from the ends to the center of the stack.

3. The multi-layer capacitor of claim 1, wherein the electrostatic capacitances of the unit capacitors non-monotonously increase from the ends to the center of the stack.

4. The multi-layer capacitor of claim 1, wherein the electrostatic capacitances of the unit capacitors placed at the two ends of the stack are less than those of the remaining unit capacitors.

5. The multi-layer capacitor of claim 1, wherein the differences in electrostatic capacitances of the unit capacitors depend on the dielectric constants of the dielectric layers in the unit capacitors.

6. The multi-layer capacitor of claim 1, wherein the differences in electrostatic capacitances of the unit capacitors depend on the thicknesses of the dielectric layers in the unit capacitors.

7. The multi-layer capacitor of claim 1, wherein the differences in electrostatic capacitances of the unit capacitors depend on the dielectric constants and the thicknesses of the dielectric layers in the unit capacitors.

8. The multi-layer capacitor of claim 2, wherein the differences in electrostatic capacitances of the unit capacitors depend on the dielectric constants of the dielectric layers in the unit capacitors.

9. The multi-layer capacitor of claim 2, wherein the differences in electrostatic capacitances of the unit capacitors depend on the thicknesses of the dielectric layers in the unit capacitors.

10. The multilayer capacitor of claim 2, wherein the differences in electrostatic capacitances of the unit capacitors depend on the dielectric constants and the thicknesses of the dielectric layers in the unit capacitors.

11. The multi-layer capacitor of claim 3, wherein the differences in electrostatic capacitances of the unit capacitors depend on the dielectric constants of the dielectric layers in the unit capacitors.

12. The multi-layer-capacitor of claim 3, wherein the differences in electrostatic capacitances of the unit capacitors depend on the thicknesses of the dielectric layers in the unit capacitors.

13. The multi-layer capacitor of claim 3, wherein the differences in electrostatic capacitances of the unit capacitors depend on the dielectric constants and the thicknesses of the dielectric layers in the unit capacitors.

14. The multi-layer capacitor of claim 4, wherein the differences in electrostatic capacitances of the unit capacitors depend on the dielectric constants of the dielectric layers in the unit capacitors.

15. The multi-layer capacitor of claim 4, wherein the differences in electrostatic capacitances of the unit capacitors depend on the thicknesses of the dielectric layers in the unit capacitors.

16. The multi-layer capacitor of claim 4, wherein the differences in electrostatic capacitances of the unit capacitors depend on the dielectric constants and the thicknesses of the dielectric layers in the unit capacitors.

17. A method for manufacturing a multi-layer capacitor comprising the steps of:
preparing green sheets;
forming internal electrode layers on the green sheets;
laminating and pressing the green sheets with the internal electrode layers formed thereon to thereby provide an unsintered stack of vertically stacked unit capacitors, the stack having two opposite end surfaces;
sintering the unsintered stack; and
forming external electrodes on the two opposite end surfaces,
wherein the pressure employed in pressing the green sheets forming the unit capacitor located at a center of the stack is higher than those employed in pressing the green sheets forming the unit capacitors located at a top end and a bottom end of the stack.

18. The method of claim 17, wherein the pressing pressures monotonously increase from the bottom end to the center of the stack, and then monotonously decrease from the center to the top end of the stack during the laminating and pressing step.

19. A method for manufacturing a multi-layer capacitor comprising the steps of:
preparing green sheets;
forming internal electrode layers on the green sheets;
laminating and compressing the green sheets with the internal electrode layers formed thereon to thereby provide an unsintered stack of vertically stacked unit capacitors, the stack having two opposite end surfaces;
sintering the unsintered stack; and
forming external electrodes on the two opposite end surfaces,
wherein the dielectric constant of the green sheet forming the unit capacitor located at a center of the stack is higher than those of the green sheets forming the unit capacitors located at a top end and a bottom end of the stacks.

20. The method of claim 19, wherein the dielectric constants of the green sheets forming the unit capacitors monotonously increase from the ends to the center of the stack.

* * * * *